Dec. 22, 1942.  H. F. ROSS  2,306,322
PRESS
Filed June 17, 1942
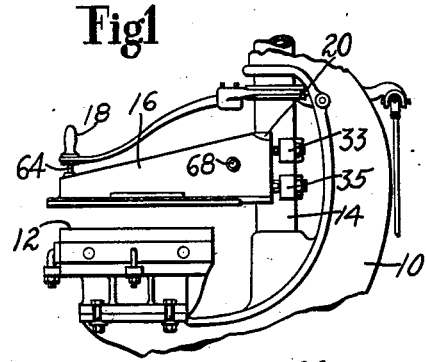
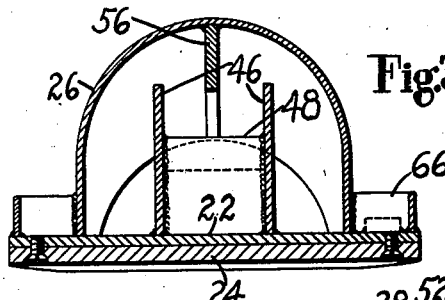
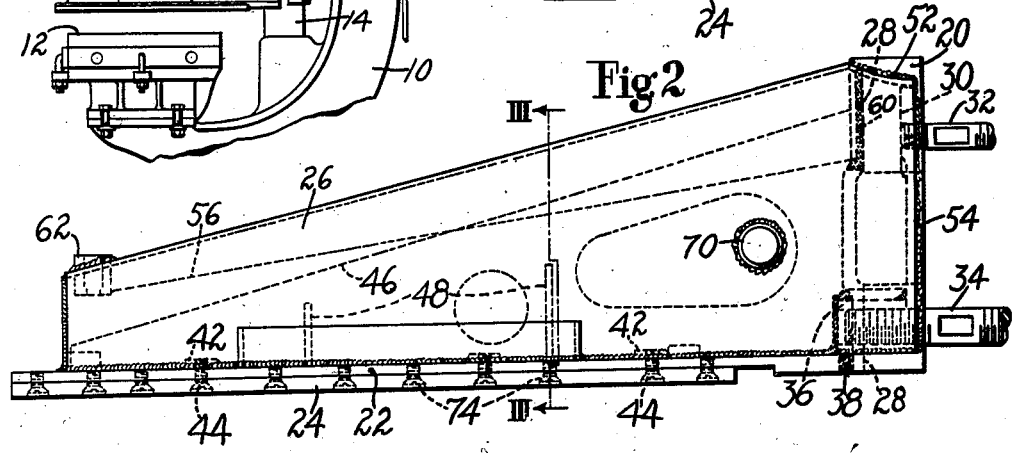
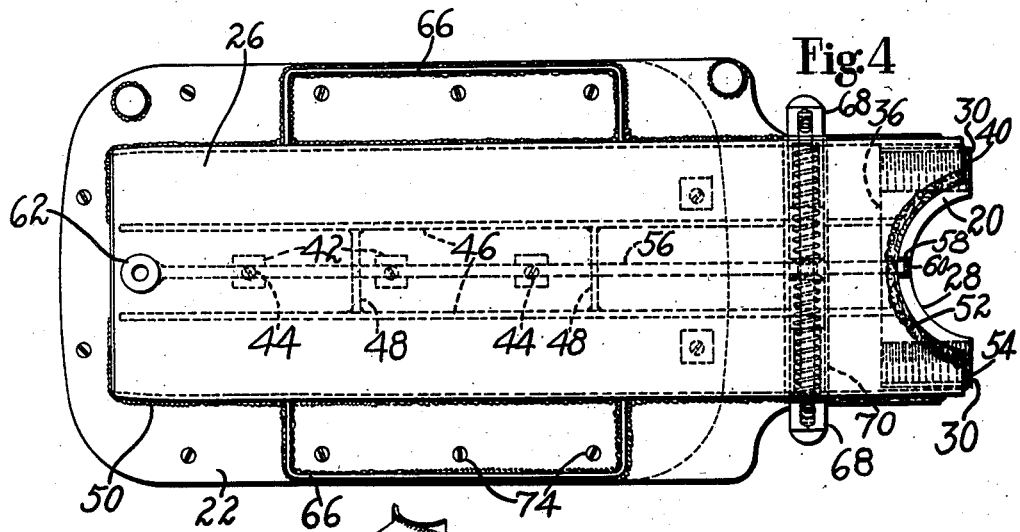
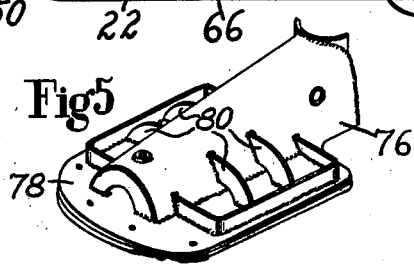
INVENTOR:
Herbert F. Ross
By his attorney Patented Dec. 22, 1942

2,306,322

UNITED STATES PATENT OFFICE 2,306,322

PRESS

Herbert F. Ross, Winchester, Mass., assignor to United Shoe Machinery Corporation, Flemington, N. J., a corporation of New Jersey Application June 17, 1942, Serial No. 447,472
In Great Britain October 30, 1941

11 Claims. (Cl. 164—23)

This invention relates to presses and is herein illustrated as embodied in a clicking press of the type disclosed in United States Letters Patent No. 921,503 granted May 11, 1909, upon application of Arthur Bates.

Machines of the type referred to have been extensively used in the shoe industry for cutting shoe parts from leather or fabric, and commonly comprise a cutting bed, a reciprocating post adjacent to the bed and carrying a beam which is movable about the axis of the post manually into position over a cutting die placed upon sheet material positioned upon the bed, the beam being movable with the post toward and away from the bed in carrying out a pressure-applying operation upon the die to produce a blank. In the operation of such machines, the die is located by hand upon the material carried by the cutting bed, the beam is swung manually into position over the die, and mechanism is actuated to effect a pressure-applying operation, after which the beam is swung laterally away from the die to permit removal of the cut blank. During the course of the day, the operator will swing the beam back and forth across the bed hundreds or thousands of times. Consequently, in order to relieve the operator of as much physical effort as possible, it is desirable that the beam be of light construction, such that it can readily be moved manually across the bed. This is accomplished in machines heretofore constructed by forming the beam of light metal, such as an aluminum alloy, for example, as disclosed in United States Letters Patent No. 1,629,870, granted May 24, 1927, upon application of Patrick J. Horgan. Light beams of this kind have proved to be highly satisfactory, but, in view of the present shortage of aluminum, it has been found necessary or desirable to provide a suitable substitute. Some experimentation has been made in connection with clicking machine beams formed of steel plates welded together, but heretofore, as far as is known, such constructions have not been satisfactory in use.

In view of the foregoing, it is an object of the present invention to provide, in a machine of the type referred to, a beam which is comparatively light in weight and so designed that it can readily be moved about the axis of its support, while at the same time it is of sufficient strength and rigidity to withstand the severe stresses to which it is subjected during its use. To this end and as illustrated, the invention provides a beam composed of metal parts, principally plates which are welded together to form a unitary structure. Preferably and as shown, the parts comprise a base plate which is welded to a supporting bracket, centrally disposed reinforcing plates welded to the base plate and the bracket, and a shell extending over the reinforcing plates and having a rib depending therefrom located between the reinforcing plates, the structure being arranged to convey the stresses produced by an applied load to the supporting structure.

These and other features of the invention are disclosed in the following specification and in the accompanying drawing, and are pointed out in the claims.

In the drawing,

Fig. 1 is a view in side elevation of a portion of a clicking machine embodying the invention;

Fig. 2 is a view in side elevation of the beam;

Fig. 3 is a cross sectional view of the beam, taken along line III—III of Fig. 2;

Fig. 4 is a plan view of the beam shown in Fig. 2; and

Fig. 5 is a perspective view of a modified form of beam.

The invention is embodied in a clicking machine which, as shown in Fig. 1, comprises a frame 10 carrying a cutting bed 12 and having a vertically reciprocating post 14, to which is secured a presser member or beam 16 which is arranged to move toward and away from the cutting bed in producing pressure-applying operations upon a die positioned upon sheet material on the bed. The beam 16 is arranged for movement laterally across the bed about the axis of the post for locating the beam in operative position relatively to the die, initiation of a pressure-applying operation being effected by depression of a starting handle 18 to set in motion mechanism (not shown) for reciprocating the post. For a more complete description of the construction and operation of the parts thus far described, reference may be had to the aforementioned Letters Patent to Bates.

The present invention is principally concerned with the construction of the beam forming part of the machine. As shown in Figs. 2, 3 and 4, the beam 16 is a unitary structure which is fabricated, principally from sheet metal, preferably steel. The main parts of the beam include a bracket 20 adapted to engage the post 14 of the machine, a base plate 22 having secured thereto a striking plate 24 and a hollow reinforcing shell 26, the bracket, the base plate and the shell being welded together.

The bracket 20 is preferably in the form of a forging, having arcuate portions 28 adapted closely to fit the surface of the post 14 and outwardly extending flanges 30 adapted to receive upper and lower securing bolts 32 and 34, which extend through members 33 and 35, respectively, for clamping the bracket to the post. Welded to the lower portion of the bracket is a curved block 36, which is screw-threaded to receive the lower bolts 34. The base plate 22 is welded to the lower portion of the block 36, the weld being shown at 38, and to the flanges 30 of the bracket, the weld being shown at 40. The upper portion of the base plate has welded thereto at spaced intervals a number of bosses 42, which are threaded to receive screws 44 for attaching the striking plate 24 to the base plate.

The base plate is reinforced against forces applied to the striking plate 24, by means of two substantially triangular plates 46 which are welded to the base plate and to the bracket 20, with the highest portion of the plates being positioned against the bracket. Additional reinforcement for the base plate is provided by vertical transverse plates 48 welded to the base plate and to the two main reinforcing plates.

The shell 26 comprises a pressed steel plate, one end of which is fitted to engage the bracket along its arcuate portion and along the ears and to extend longitudinally of the base plate outwardly from the bracket, being arched over the reinforcing plates. The shell is tapered outwardly from the bracket toward the end of the base plate, and is secured to the base plate by welding along the edges in contact therewith, as shown at 50. The shell is also welded to the bracket along its curved portion, as shown at 52, and along the outer portions of the flanges 30, as shown at 54.

In order to reinforce the shell, principally against compression, there is welded thereto a substantially triangular plate forming a rib 56, which is tapered from the bracket end of the shell outwardly of the beam, and extends longitudinally of the shell depending from the upper portion of the underside of the shell and positioned between the two reinforcing plates 46. The rib is arranged to extend through a slot 58 in the curved portion 28 of the bracket, and is rigidly secured therein by "puddling" metal in the slot during the operation of welding the rib to the bracket. The puddled metal is shown at 60 (Figs. 2 and 4), and constitutes a portion of the rib, such that when the curved surface 28 is machined the rib 56 is also machined and forms part of the bearing surface. This construction is such that the rib will transmit forces applied to it directly to the post 14, thus considerably stiffening the upper portion of the shell.

The outer end of the shell is provided with a boss 62, welded thereto and arranged to receive a pin 64 (Fig. 1) for guiding the starting handle 18.

To provide additional reinforcement for the base plate portions which extend outwardly beyond the shell, vertical plates 66 are bent into U-shape and welded to the base plate and to the sides of the shell. These plates 66 act not only as reinforcing members, but also as hand holds by which the beam can be swung about the axis of the post.

The spacing of the various reinforcing members, including the shell itself, is such that the base plate is backed up by vertical plates, which form trusses or struts so closely spaced that the smallest die which is likely to be used in the machine will bridge over at least two of the plates. This produces a beam construction which is of considerable rigidity.

The beam is provided with bumpers 68 in the form of spring-pressed plungers which are located in a tube 70 extending through openings in the shell and the reinforcing plates 46, and welded to the shell, as indicated by reference character 72 (Fig. 2).

The striking plate 24, which is preferably of a comparatively soft metal such as aluminum alloy which will not destroy the uppermost edge of a double edged die when the beam is brought down upon the same in forcing the die through material being operated upon, is held against the base plate 22 by the screws 44, and, in addition, is secured against warping action by screws 74 extending through the striking plate and into the base plate 22.

It is desirable to provide beams of various sizes, that is, having striking faces of different widths and lengths. However, the present beam construction lends itself to the production of several sizes of beams without varying the shape of the shell and reinforcing plates, these members being of sufficient strength adequately to reinforce the base plate and striking plates of sizes larger than that shown in Figs. 2, 3 and 4. For example, in Fig. 5 there is shown a beam in which the shell 76 is the same size as that shown in Fig. 3, but in which the base plate 78 is considerably wider than the base plate 22. The shell provides adequate reinforcing to the central portions of the plate and, to ensure that the edges of the plate are reinforced, additional vertical reinforcing plates 80 extending at right angles to the shell are welded thereto and to the upper portions of the base plate.

Beams constructed as above set forth have been found to be not only as light or lighter in weight when compared to aluminum alloy beams of the same size, but are of considerably greater rigidity and consequently there is less deflection under load applied, particularly at the outer end of the beam. This results in more uniform cutting action over different portions of the bed.

Having described my invention, what I claim as new and desire to secure by Letters Patent of the United States is:

1. A beam for presses comprising a supporting bracket, a base plate welded to the bracket, two spaced reinforcing plates extending longitudinally of the base plate heightwise of the bracket and welded to the base plate and bracket, and a hollow shell enclosing the reinforcing plates and welded to the base plate and to the bracket.

2. A beam for presses comprising a supporting bracket, a base plate welded to the bracket, two spaced reinforcing plates extending longitudinally of the base plate heightwise of the bracket and welded to the base plate and bracket, the said reinforcing plates being tapered outwardly from the bracket toward the end of the beam, and a hollow shell enclosing the reinforcing plates and welded to the base plate and to the bracket.

3. A beam for presses comprising a supporting bracket, a base plate welded to the bracket, two spaced reinforcing plates extending longitudinally of the base plate heightwise of the bracket and welded to the base plate and bracket, a hollow shell enclosing the reinforcing plates and welded to the base plate and to the bracket, and a reinforcing rib depending from the shell and welded thereto, said rib being located between the reinforcing plates.

4. A beam for presses comprising a supporting bracket, a base plate welded to the bracket, two spaced reinforcing plates extending longitudinally of the base plate heightwise of the bracket and welded to the base plate and bracket, a hollow shell enclosing the reinforcing plates and welded to the base plate and to the bracket, and a reinforcing rib in the form of a plate welded to the shell between the reinforcing plates and being tapered outwardly from the bracket toward the end of the beam.

5. A beam for presses comprising a vertically extending bracket, a base plate welded to the bracket, a plurality of spaced vertical plates welded to the bracket and to the base plate, and a curved hollow shell welded to the bracket and base plate and having a rib extending longitudinally of the shell and positioned between the vertical plates.

6. A press having a reciprocating post, a beam comprising a bracket having a curved portion arranged to engage the post, a base plate welded to the bracket, a curved tapered hollow shell welded to the bracket and to the base plate, and a rib depending from the shell and welded thereto, said rib having a portion extending through a slot in the bracket into engagement with the post.

7. A press having a reciprocating post, a beam comprising a bracket having a curved portion arranged to engage the post, a base plate welded to the bracket, a hollow shell welded to the bracket and to the base plate, and a rib depending from the shell and welded thereto, said rib having a portion extending through the bracket into engagement with the post for transmitting directly to the post forces applied to the shell.

8. A press having a reciprocating post, a beam comprising a bracket having a curved portion arranged to engage the post, a base plate welded to the bracket, a hollow shell welded to the bracket and to the base plate, and a rib depending from the shell and welded thereto, said rib being located centrally of the bracket and having a portion extending through the bracket into engagement with the post.

9. In a press having a frame, a cutting bed supported in the frame, and a post mounted at one side of the bed for reciprocation in the frame, a beam comprising a bracket, means for securing the bracket to the post, a base plate extending outwardly from the bracket and welded thereto, two reinforcing plates extending heightwise of the bracket and longitudinally of the base plate, the reinforcing plates being welded to the base plate and to the bracket, and a hollow shell enclosing the reinforcing plates and welded to the bracket and to the base plate.

10. In a press having a frame, a cutting bed supported in the frame, and a post mounted at one side of the bed for reciprocation in the frame, a beam comprising a bracket, means for securing the bracket to the post, a base plate extending outwardly from the bracket and welded thereto, two reinforcing plates extending heightwise of the bracket and longitudinally of the base plate, the reinforcing plates being welded to the base plate and bracket, a hollow shell enclosing the reinforcing plates and welded to the bracket and to the base plate, and a reinforcing rib welded to the shell and to the bracket and positioned between the reinforcing plates.

11. In a press having a frame, a cutting bed supported in the frame, and a post mounted at one side of the bed for reciprocation in the frame, a beam comprising a bracket, means for securing the bracket to the post, a base plate extending outwardly from the bracket and welded thereto, two reinforcing plates extending heightwise of the bracket and longitudinally of the base plate, the reinforcing plates being welded to the base plate and bracket, a hollow shell enclosing the reinforcing plates and welded to the bracket and to the base plate, and a reinforcing rib welded to the shell and to the bracket and positioned between the reinforcing plates, said rib having a portion extending through an opening in the bracket into engagement with the post.

HERBERT F. ROSS.